March 29, 1955
W. D. HERSHBERGER
2,705,284
FREQUENCY STABILIZATION SYSTEM
Filed Nov. 4, 1948
2 Sheets-Sheet 1
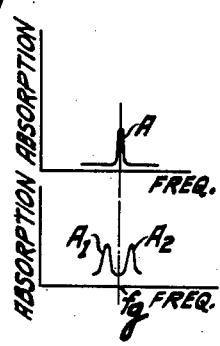
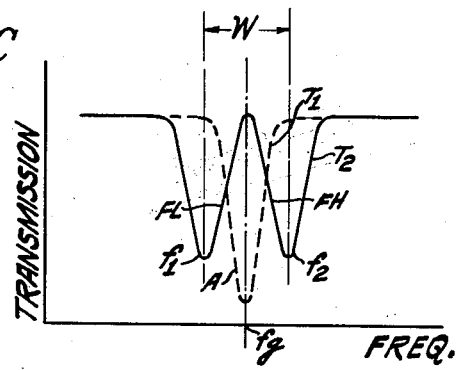
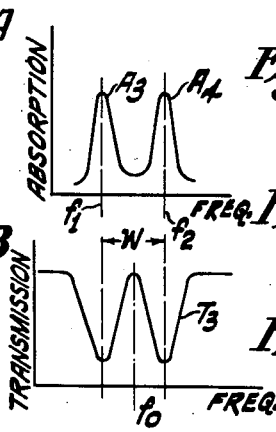
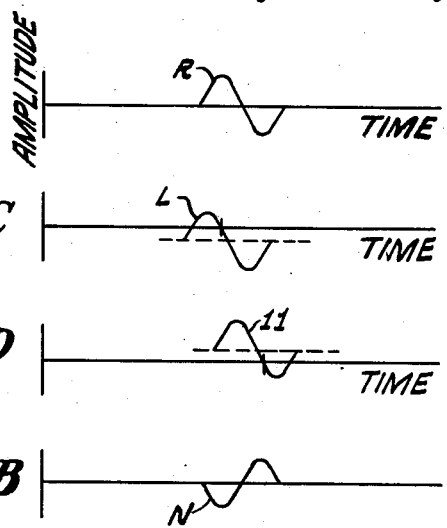
INVENTOR
William D. Hershberger
BY
ATTORNEY

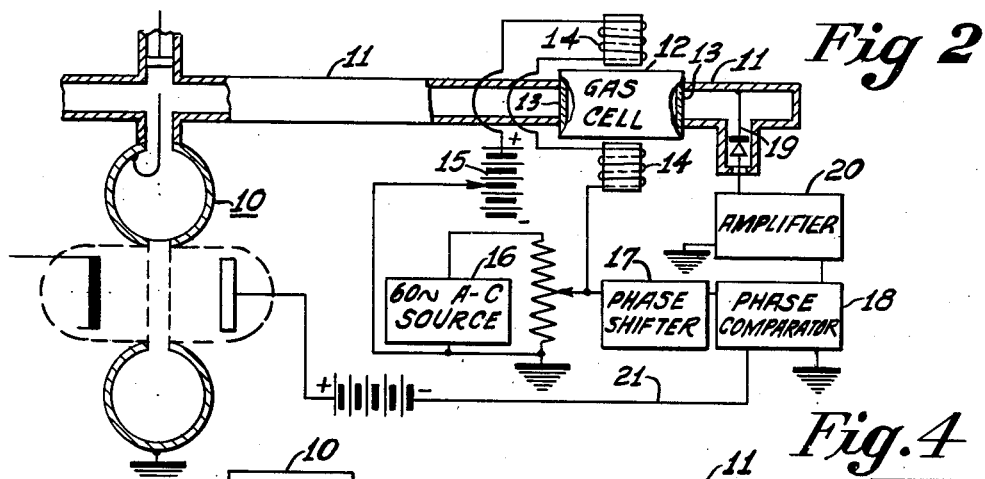
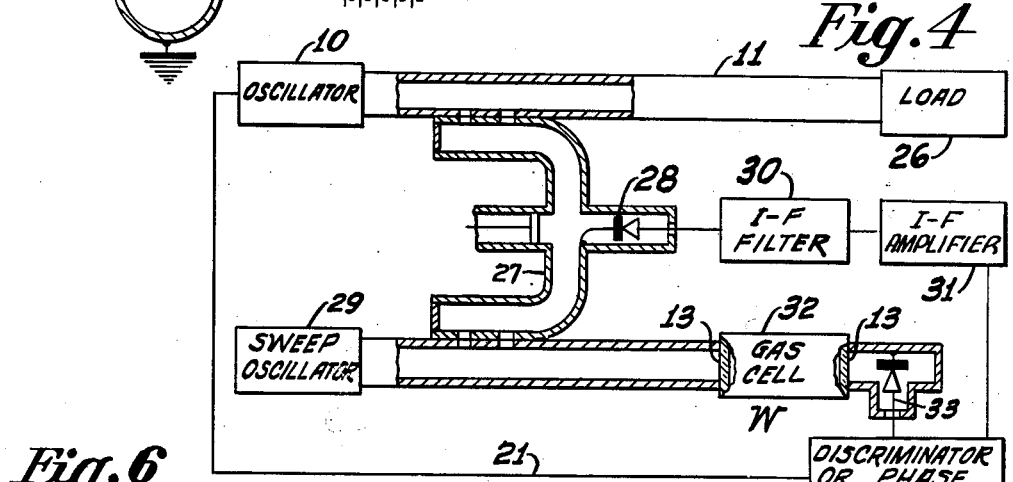
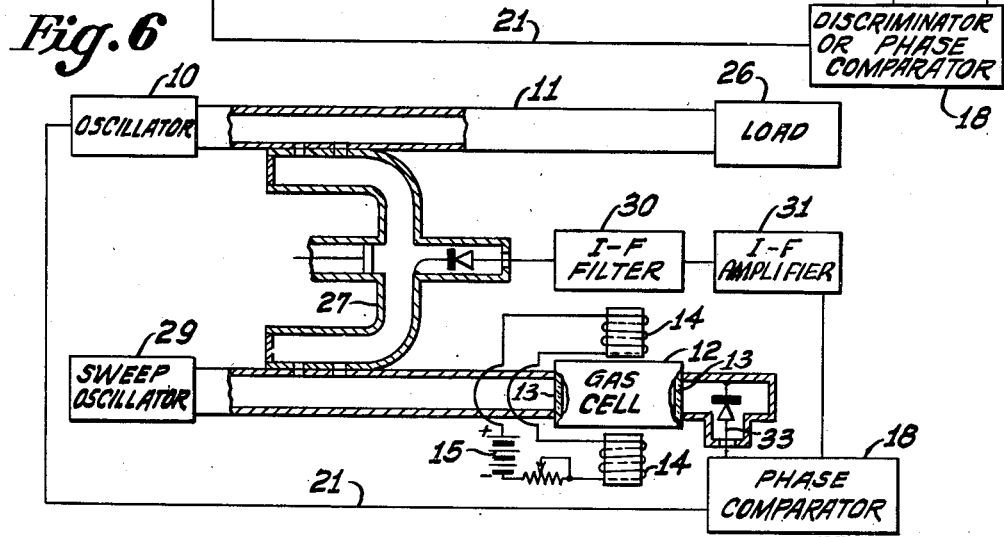

United States Patent Office 2,705,284
Patented Mar. 29, 1955

2,705,284

FREQUENCY STABILIZATION SYSTEM

William D. Hershberger, Princeton, N. J., assignor to Radio Corporation of America, a corporation of Delaware Application November 4, 1948, Serial No. 58,295

13 Claims. (Cl. 250—36)

This invention relates to the stabilization of oscillators by methods and systems utilizing molecular resonance effects exhibited by certain gases at microwave frequencies.

In accordance with the present invention, as distinguished from prior stabilizing methods and systems using a selected absorption line or narrow frequency spectrum of a gas as a frequency standard, it is provided that the gas shall exhibit maximum transmission at a standard frequency which may precisely equal the desired operating frequency, or harmonic thereof, or may differ therefrom by a definite preselected amount depending upon the method of frequency-comparison used.

In some forms of the invention, a transmission "window" is formed by subjecting the gas to a magnetic field which splits the selected gas-absorption line so to provide a transmission/frequency characteristic having a narrow region of high transmissivity between immediately adjacent regions of high absorption. In one form of the invention, the magnetic field has an alternating component to effect modulation of microwave energy being transmitted through the gas cell from the oscillator to be stabilized, the phase relation between the demodulated output of the gas cell and the exciting source for the alternating magnetic field varying in accordance with deviation from the desired operating frequency. In another form of the invention, a magnetic field having no appreciable alternating component is applied to a gas cell through which is transmitted energy from a sweep oscillator. The phase of the demodulated output of the gas cell is compared with pulses each produced as the beat frequency of the outputs of the oscillators passes through a preselected value equal to the difference between the standard frequency and the desired operating frequency.

In still another form of the invention, a transmission "window" is provided by utilization of a single gas itself having two closely spaced absorption lines, or, alternatively, by utilization of two gases in the same or different cells which jointly provide two closely spaced absorption lines. In either case, a rather wide frequency range, including such pair of lines and the intervening "window," is scanned by a sweep oscillator and the phase relation between the pulse output of the gas cell or cells is compared with pulses occurring as the beat frequency of the sweep and stabilized oscillators equals the difference between the standard frequency and the desired operating frequency. In these, as well as in the other arrangements above briefly described, the precise frequency error information so obtained is utilized, preferably automatically, to maintain the phase relation corresponding with the desired operating frequency.

The invention further resides in methods and systems having the novel features hereinafter described and claimed.

For a more detailed understanding of the invention and for illustration of systems embodying it, reference is made to the accompanying drawings in which:

Figures 1A, 1B and 1C are explanatory figures referred to in discussion of fundamentals underlying the invention;

Figure 2 illustrates a frequency control system including a gas cell subjected to an alternating magnetic field;

Figures 3A, 3B, 3C and 3D are explanatory figures referred to in discussion of the operation of Figure 2;

Figure 4 schematically illustrates a modification of Figure 2 in which the transmission "window" is provided by selection of a gas or gases;

Figures 5A and 5B are explanatory figures referred to in discussion of the operation of Figure 4; and Figure 6 schematically illustrates a modification of Figure 4 utilizing a constant magnetic field.

The microwave absorption spectra of ammonia, carbonyl sulphide, methyl halides and other gases having a dipole moment comprise absorption "lines" or narrow frequency spectra of distinctive and different frequency distribution for each gas. At very low pressures, in the case of ammonia for example, each of these "lines" breaks up into a plurality of sharply defined absorption lines, each precisely corresponding with a definite frequency. For the shake of definiteness, it will be assumed that the selected absorption line A, Figure 1A, is the (3, 3) line of ammonia at 23,870.1 megacycles. When the gas is subjected to a strong magnetic field, the absorption line A is split into two lines $A_1$ and $A_2$, Figure 1B, symmetrically located with respect to the original absorption line position. The splitting is linear, and each component of the original line moves away from it 720 kilocycles per 1,000 gauss of the applied magnetic field.

Referring to Figure 1C, curve $T_1$, represents the transmission/frequency characteristic of the gas in the vicinity of the absorption line A in absence of a strong magnetic field; curve $T_1$ is characterized by a transmission minimum at the frequency $f_g$ used, as hereinafter described, as a standard frequency. When a strong magnetic field is applied to the gas, its transmission/frequency characteristic in the vicinity of frequency $f_g$ changes from $T_1$ to $T_2$ characterized by a maximum transmission at frequency $f_g$ and transmission minimum at closely adjacent frequencies $f_1$ and $f_2$. In effect, the gas when so subjected to a magnetic field has a transmission window W centered at frequency $f_g$.

Referring to Figure 2 as exemplary of a frequency-stabilizing system utilizing as a frequency-standard a molecular resonant gas having such a transmission window, the oscillator 10 to be stabilized is connected to a waveguide or concentric line 11 in which is included a cell 12 containing the gas. The seals 13, 13 of thin mica, or equivalent, retain the gas within the cell which may be a length of waveguide or resonant chamber and permit passage therethrough of microwave energy from oscillator 10 which may be a klystron, magnetron or other high-frequency generator. The coils 14, 14 are disposed to subject the gas within cell 12 to a magnetic field which effects splitting of a selected absorption line of the gas as discussed in connection with Figures 1B and 1C. The exciting source for the electromagnetic 14, 14 may comprise or consist of a source 16 of low-frequency alternating current, for example, 60 cycle current. For the moment assuming the field applied to the gas has no unidirectional component, the transmission characteristic of the gas cell periodically changes from curve $T_1$ to curve $T_2$, Figure 1C, and the time-amplitude output of cell 12 as demodulated by rectifier 19, preferably of the crystal type, therefore uniquely depends upon the relation between the actual operating frequency of oscillator 10 with respect to the center frequency $f_g$ of the transmission window W which is effectively periodically opened and closed at the frequency of source 16.

The demodulated output of the cell 12, after suitable amplification by amplifier 20, is impressed upon one input circuit of a phase-comparator or discriminator 18. Upon the other input circuit of the phase-comparator 18 is impressed a reference phase derived from the source 16. The phase-shifter 17 interposed between the A. C. source 16 and the phase-comparator 18 is adjusted to compensate for the phase-shift of amplifier 20 and for the difference in phase between the magnetic field produced by coils 14 and the source 16 of their exciting current. With the phase-shifter 17 properly adjusted, the unidirectional current output of the phase-comparator 18 is zero when the operating frequency of the oscillator corresponds with the center frequency $f_g$ of the transmission window W of the gas within cell 12. Upon positive or negative deviation of the operating frequency with respect to standard frequency $f_g$ the phase of the demodulated output of cell 12 is advanced or retarded with respect to the reference phase and the unidirectional output of the phase-comparawater so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

operating frequency, an electromagnet for applying a field to said gas to split said absorption spectrum and so provide a narrow intervening region of high transmissivity, a source of unidirectional current including an alternating current component for exciting said electromagnet so as to modulate oscillator energy transmitted by said gas, means for demodulating oscillator energy transmitted through said cell by said gas, a phase-comparator having input circuits upon which are respectively impressed the demodulated output of said cell and a reference phase derived from said exciting source, and a frequency-control circuit for said oscillator upon which is impressed the unidirectional output of said phase-comparator.

5. A system for stabilizing the operating frequency of an oscillator comprising, a cell containing gas having an absorption frequency spectrum peaked at the desired operating frequency, an electromagnet for applying a field to said gas to split said absorption spectrum and so provide a narrow intervening region of high transmissivity, a source of unidirectional current including an alternating current component for exciting said electromagnet, a demodulator for oscillator energy transmitted by said cell and modulated during transmission by the alternating field of said electromagnet, a discriminator having input circuits upon which are respectively impressed the demodulated output of said cell and a reference phase derived from said exciting source, a phase-shifter for obtaining null output of said phase-comparator when the operating frequency corresponds with said gas region of high transmissivity, and means for applying to said oscillator a frequency control varying in accordance with the sense of the output of said discriminator.

6. A system for stabilizing the operating frequency of an oscillator comprising, a cell containing a gas at low pressure, means for applying a magnetic field to said cell whereby the transmission/frequency characteristic of said cell and field has a maximum at a selected standard frequency, a sweep oscillator for scanning a frequency range including said standard frequency, means for demodulating the output of said cell to produce a series of pulses each occurring as the sweep oscillator frequency passes through said standard frequency, a mixer upon which the outputs of said oscillators are impressed to produce a varying beat-frequency, demodulating means for producing a second series of pulses each occurring as the beat-frequency passes through a value corresponding with the difference between the desired operating frequency and said maximum transmission frequency of the gas, and means producing a unidirectional error voltage for control of the frequency of said oscillator including a phase-comparator upon whose input circuits said two series of pulses are respectively impressed.

7. A system for stabilizing the operating frequency of an oscillator comprising, a cell containing gas having an absorption frequency spectrum, means producing a magnectic field applied to said gas to split said absorption spectrum and so provide a narrow region of high transmissivity at the original location of the maximum absorption frequency of said spectrum, a sweep oscillator for scanning a frequency range including said narrow region, means for demodulating the output of said cell to produce a series of pulses each occurring as said sweep oscillator frequency passes through said narrow region, a mixer upon which the outputs of said oscillators are impressed to produce a varying beat-frequency, demodulating means for producing a second series of pulses each occurring as the beat-frequency passes through a value corresponding with the difference between the operating frequency and the center frequency of said narrow region, and means for producing an error voltage for control of the frequency of said oscillator including a phase-comparator upon whose input circuits said two series of pulses are respectively impressed.

8. A system for stabilizing the operating frequency of an oscillator comprising, a gas cell having closely spaced absorption frequency spectra and means for applying a magnetic field to said cell whereby the combined characteristics of said cell and field provide an intervening narrow region of high transmissivity, a sweep oscillator for scanning a frequency range including said narrow region, means for demodulating the output of said cell to produce a series of pulses each occurring as said sweep oscillator frequency passes through said narrow region, a mixer upon which the outputs of said oscillators are impressed to produce a varying beat-frequency, demodulating means for producing a second series of pulses each occurring as the beat-frequency passes through a value corresponding with the difference between the operating frequency and the center frequency of said narrow region, and means for producing an error voltage for control of the frequency of said oscillator including a phase-comparator upon whose input circuits said two series of pulses are respectively impressed.

9. A system for stabilizing the operating frequency of an oscillator including, in combination, a gas cell for selective transmission of microwave energy, means for applying a magnetic field to said cell whereby the transmission/frequency characteristic of said combination has a maximum at a selected standard frequency and minima at slightly higher and slightly lower frequencies respectively, means for modulating microwave energy transmitted through said cell, means for demodulating said transmitted energy, and means for utilizing said demodulated energy to control the frequency of said oscillator.

10. Apparatus for stabilizing the frequency of a microwave oscillator comprising, a body of gas at low pressure, means for applying a magnetic field to said gas whereby the transmission/frequency characteristic of said gas has a maximum at a selected frequency related to the desired operating frequency, means for impressing microwave energy upon said body of gas, means for frequency-modulating said impressed microwave energy over a spectrum including said selected frequency, means for demodulating the energy transmitted by said gas, and means for deriving from said demodulated energy a control effect for stabilizing the frequency of said oscillator.

11. Apparatus for stabilizing the frequency of a microwave oscillator comprising, a body of gas at low pressure, means for impressing energy from said oscillator upon said gas, means for applying a magnetic field to said gas to split said absorption spectrum and to modulate said impressed energy during its transmission by said gas, a phase standard responsive to said alternating field, and means for comparing the phase of the demodulated energy transmitted by said gas with the phase of said standard to derive a frequency control effect for said oscillator.

12. Apparatus for stabilizing the operating frequency of an oscillator comprising, a body of gas at low pressure providing an absorption frequency spectrum at a selected standard frequency, means for applying a constant unidirectional magnetic field to said gas to split said absorption spectrum and so provide an intervening narrow region of high transmissivity centered at said standard frequency, a sweep frequency oscillator having a frequency spectrum including said absorption frequency spectrum, means for applying energy from said sweep oscillator upon said body of gas to modulate energy transmitted by said gas, means for demodulating the energy transmitted by said gas to produce a series of pulses each occurring as the frequency of said sweep oscillator passes through said narrow region, means for mixing the outputs of said oscillators to produce a varying beat frequency signal, means for producing a second series of pulses each occurring as the beat frequency passes through a value corresponding with the difference between the desired operating frequency and the center frequency of said narrow region, and means for varying the frequency of said stabilized oscillator to minimize deviation from a fixed phase relation of said two series of pulses.

13. Apparatus for stabilizing the operating frequency of an oscillator comprising, a body of gas at low pressure providing an absorption frequency spectrum at a selected standard frequency, means for applying a constant unidirectional magnetic field to said gas to split said absorption spectrum and so provide an intervening narrow region of high transmissivity centered at said standard frequency, a sweep frequency oscillator having a frequency spectrum including said absorption frequency spectrum, means for applying energy from said sweep oscillator upon said body of gas, means for demodulating the energy transmitted by said gas to produce a series of pulses each occurring as the frequency of said sweep oscillator passes through said narrow region, means for mixing the outputs of said oscillators to produce a varying beat frequency signal, means for producing a second series of pulses each occurring as the beat frequency equals the numerical difference between the desired op-